(12) United States Patent
Sjodin

(10) Patent No.: US 9,513,071 B2
(45) Date of Patent: *Dec. 6, 2016

(54) MATERIAL FOR JOINING AND PRODUCT PRODUCED THEREWITH

(75) Inventor: Per Erik Sjodin, Lund (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,744

(22) Filed: Mar. 22, 2011

(65) Prior Publication Data

US 2011/0226459 A1    Sep. 22, 2011

Related U.S. Application Data

(63) Continuation-in-part of application No. 10/416,248, filed as application No. PCT/SE01/02478 on Nov. 8, 2001, now abandoned.

(30) Foreign Application Priority Data

Nov. 10, 2000    (SE) .................................. 0004118-6

(51) Int. Cl.
*C22C 30/00* (2006.01)
*F28F 21/08* (2006.01)
(Continued)

(52) U.S. Cl.
CPC ........... *F28F 21/082* (2013.01); *B23K 35/025* (2013.01); *B23K 35/0233* (2013.01);
(Continued)

(58) Field of Classification Search
CPC ....... C22C 38/04; C22C 38/34; C22C 38/44; C22C 38/58

USPC ............................................ 420/34; 428/615
See application file for complete search history.

(56) References Cited

U.S. PATENT DOCUMENTS 4,135,656 A    1/1979 Stern
4,314,661 A    2/1982 DeCristofaro et al.
(Continued)

FOREIGN PATENT DOCUMENTS

AU    2002214472 B2    5/2002
CN    1064636    9/1992
(Continued)

OTHER PUBLICATIONS

Metals Handbook 8th Edition, vol. 6 Welding and Brazing, American Society for Metals, Ohio, Aug. 1971, p. 664, table 2.
(Continued)

*Primary Examiner* — Rebecca Lee
(74) *Attorney, Agent, or Firm* — MKG, LLC

(57) ABSTRACT

The invention relates to an iron-based brazing material comprising a brazing alloy, which alloy comprises: from about 9 wt % to about 30 wt % Cr, from about 5 wt % to about 25 wt % Ni, from about 0 wt % to about 9 wt % Mo, from about 0 wt % to about 5 wt % Mn, from about 0 wt % to about 1 wt % N, from about 6 wt % to about 20 wt % Si. Within the alloy is at least one of the B and the P are present as a melting point lowering supplement to Si, and wherein B is from about 0.1 wt % to about 1.5 wt %, or wherein P is from about 0.1 to about 15 wt % P. The brazing alloy may comprise contaminating elements as at least one of C, O, and S, and optionally the brazing alloy also comprises at least one micro-alloying element as V, Ti, W, Nb, or Ta, and the micro-alloying element is less than 1.5 wt % in the brazing alloy. All values are stated in weight percent, and wherein Si, B and P lower the liquidus temperature, that is the temperature when the brazing material is completely melted.

11 Claims, 2 Drawing Sheets

Diagram 1

(51) Int. Cl.
*B23K 35/02* (2006.01)
*B23K 35/30* (2006.01)
*C22C 1/02* (2006.01)
*C22C 38/04* (2006.01)
*C22C 38/34* (2006.01)
*C22C 38/44* (2006.01)
*C22C 38/58* (2006.01)
*F28F 9/26* (2006.01)
*C22C 38/24* (2006.01)

(52) U.S. Cl.
CPC ......... *B23K35/0244* (2013.01); *B23K 35/308* (2013.01); *B23K 35/3066* (2013.01); *B23K 35/3086* (2013.01); *B23K 35/3093* (2013.01); *C22C 1/02* (2013.01); *C22C 38/04* (2013.01); *C22C 38/34* (2013.01); *C22C 38/44* (2013.01); *C22C 38/58* (2013.01); *F28F 9/26* (2013.01); *B23K 2201/14* (2013.01); *B23K 2203/02* (2013.01); *Y10T 428/12958* (2015.01)

(56) References Cited

U.S. PATENT DOCUMENTS

| | | | | |
|---|---|---|---|---|
| 4,402,742 | A | | 9/1983 | Pattanaik |
| 4,410,604 | A | * | 10/1983 | Pohlman et al. ............ 428/681 |
| 4,444,587 | A | * | 4/1984 | Kelly ............................ 420/44 |
| 4,444,589 | A | | 4/1984 | Sugitani et al. |
| 4,516,716 | A | * | 5/1985 | Coad ....................... 228/262.42 |
| 4,857,695 | A | | 8/1989 | Monden et al. |
| 5,118,028 | A | | 6/1992 | Ogawa |
| 5,306,477 | A | | 4/1994 | Horn et al. |
| 5,462,113 | A | | 10/1995 | Wand |
| 5,916,518 | A | | 6/1999 | Chesnes |
| 5,919,577 | A | | 7/1999 | Hasegawa et al. |
| 6,264,761 | B1 | | 7/2001 | Hasegawa et al. |
| 6,530,514 | B2 | | 3/2003 | Shabtay |
| 6,656,292 | B1 | | 12/2003 | Rabinkin et al. |
| 7,285,151 | B2 | | 10/2007 | Sjodin et al. |
| 7,455,811 | B2 | | 11/2008 | Sjodin |
| 2004/0056074 | A1 | | 3/2004 | Sjodin |
| 2004/0184945 | A1 | | 9/2004 | Sjodin |
| 2005/0072268 | A1 | | 4/2005 | Sjodin et al. |
| 2008/0006676 | A1 | | 1/2008 | Rangaswamy et al. |
| 2008/0199718 | A1 | | 8/2008 | Sjodin et al. |
| 2008/0318082 | A1 | | 12/2008 | Hartmann et al. |
| 2009/0305078 | A1 | | 12/2009 | Sjodin |
| 2010/0026726 | A1 | | 2/2010 | Fujii et al. |
| 2011/0226459 | A1 | | 9/2011 | Sjodin |

FOREIGN PATENT DOCUMENTS

| | | | |
|---|---|---|---|
| CN | 1474732 | A | 2/2004 |
| CN | 1514758 | | 7/2004 |
| CN | 1520343 | A | 8/2004 |
| DE | 19803392 | A1 | 8/1999 |
| DE | 10252577 | A1 | 12/2002 |
| DE | 10321524 | A1 | 12/2004 |
| EP | 0195338 | A2 | 9/1986 |
| EP | 0757111 | A1 | 2/1997 |
| EP | 0804993 | A1 | 11/1997 |
| EP | 0854002 | A1 | 7/1998 |
| EP | 0827437 | B1 | 8/2000 |
| EP | 1347859 | B1 | 1/2007 |
| GB | 65577 | A | 8/1951 |
| GB | 909049 | * | 10/1962 |
| JP | 439648 | | 4/1968 |
| JP | S53144852 | A | 12/1978 |
| JP | 55-148701 | A | 11/1980 |
| JP | 59-101244 | | 6/1984 |
| JP | 59143055 | A | 8/1984 |
| JP | 62-081288 | A | 4/1987 |
| JP | 62-227595 | A | 10/1987 |
| JP | 62-183994 | A | 12/1987 |
| JP | 01-205898 | A | 8/1989 |
| JP | 02-101148 | A | 4/1990 |
| JP | 02-207995 | | 8/1990 |
| JP | 03-086367 | A | 4/1991 |
| JP | 09323175 | A | 12/1997 |
| JP | 20041065 | | 1/2004 |
| JP | 2004512964 | A | 5/2004 |
| RU | 2167751 | C2 | 5/2001 |
| SU | 199651 | A1 | 7/1967 |
| WO | 0238327 | A1 | 5/2002 |
| WO | 02/090038 | A1 | 11/2002 |
| WO | 02098600 | A1 | 12/2002 |
| WO | 2005038382 | A1 | 4/2005 |
| WO | 2006126953 | A1 | 11/2006 |

OTHER PUBLICATIONS

Swedish International Search Report for Application No. PCT/SE 01/02478; date of completion Mar. 13, 2002.
Swedish International Search Report for Application No. PCT/SE 02/01047; date of completion Aug. 9, 2002.
Swedish International Search Report for Application No. PCT/SE2006/000618; date of mailing Sep. 8, 2006.
PCT International Search Report for Application No. PCT/SE2007/001011; date of mailing May 20, 2008.
KIPO Notice of Preliminary Rejection for Application No. 10-2009-7012449; dated Sep. 5, 2013.
Office Action issued in Korean Application No. 10-2009-7012449, dated May 20, 2014.
M. Schwartz, Manufacturing Processes and Materials Series, Chapman & Hall (1995), Brazing for the engineering technologist, p. 11.
First Office Action issued in corresponding Chinese Application No. 201410440864.5, dated Nov. 2, 2015, pp. 1-14.
Search Report issued in corresponding Chinese Application No. 201410440864.5, dated Oct. 23, 2015, pp. 1-3.
International Preliminary Report on Patentability issued in corresponding PCT Application No. PCT/SE2007/001011, dated Feb. 26, 2009, pp. 1-9.
Brazing and Soldering, Proceedings of the 4th International Brazing and Soldering Conference, Apr. 26-29, 2009, Hilton in the Walt Disney World Resort, Orlando, Florida, USA, pp. 125-129.
Bolton et al, Silicide Phase Formation and its Influence on Liquid Phase Sintering in 316L Stainless Steel with Elemental Silicon Additions, Powder Metallurgy vol. 41 No. 2, 1998, pp. 93-101.
Eagar, Energy Sources Used for Fusion Welding, p. 3, Schwartz, Fundamentals of Brazing, pp. 114-129 Metals Handbook 10th Edition, vol. 6 Welding and Brazing, American Society for Metals, Dec. 1993.
Brazing, Karlebo Handbook, Chapter 12.3.7 Brazing, Liber Utbildning, 1992, p. 750.
Wright, High-Strength Low-Alloy Steel Forgings, Metals Handbook 10th Edition, vol. 1 Properties and Selection: Irons, Steels, and High-Performance Alloys, American Society for Metals, Mar. 1990, pp. 358-359.
Wang et al, Mechanical Properties, Corrosion Resistance, and High Temperature Oxidation Resistance of Sintered Duplex Stainless Steels, Powder Metallurgy vol. 29 No. 3, 1986, pp. 177-182.

* cited by examiner

MATERIAL FOR JOINING AND PRODUCT PRODUCED THEREWITH

CROSS REFERENCE TO RELATED APPLICATION

This application is a continuation-in-part application of and claims the benefit of U.S. patent application Ser. No. 10/416,248, having the filing date of Sep. 19, 2003, and which claims the benefit of PCT/SE01/02478, having the filing date of Nov. 8, 2001, and which claims the benefit of Swedish Patent Application No. 0004118-6, having the filing date of Nov. 10, 2000, the contents of all of the foregoing applications being incorporated by reference herein in their entireties.

TECHNICAL FIELD

The present invention relates to an iron based brazing material for joining objects by brazing. The invention also comprises a brazed product produced by brazing together objects of an iron based material with an iron based brazing material according to the invention.

BACKGROUND OF INVENTION

Different steels or iron based materials are usually joined by brazing with Ni- or Cu-brazing materials. In some applications the brazing material may consists of Ag or Co.

Brazing is a process for tightening/joining, at which the temperature is below the original solidus temperature of the base material, i.e. the elements that should be joined/tightened.

Brazing materials refer to materials for joining or tightening, which completely or partly melts during the brazing process.

When brazing with Cu one generally uses pure or almost pure Cu. The pure copper brazing material has a well defined melting point, while nickel brazing materials, depending on the fact that they consists of alloys often have a melting interval instead.

When joining plates of stainless steel in plate heat exchangers brazing materials of copper is often used. Copper is however not suitable for all kinds of applications. The use of brazing material of copper for food applications is not allowed for example, but it is used for district heating and tap water installations. Heat exchangers joined together with brazing material of nickel are used in many connections and are also allowed for a limited number of food applications.

If brazing materials containing nickel alloys are used for joining objects of iron or non Ni-based materials, the composition of the brazed joint differs significantly from the composition of the materials, which are joined together. This can result in undesired differences in chemical and mechanical properties.

Brazing material wherein the amount of boron is said to be about 2 to about 6% in order to obtain the desired lowering of the liquidus temperature are known.

SUMMARY OF INVENTION

The brazing material of the invention relates to an iron-based brazing alloy. The brazing alloy comprises from about 9 wt % to about 30 wt % Cr (chromium), from about 5 wt % to about 25 wt % Ni (nickel), from about 0 wt % to about 9 wt % Mo (molybdenum), from about 0 wt % to about 5 wt % Mn (manganese), from about 0 wt % to about 1 wt % N (nitrogen), from about 6 wt % to about 20 wt % Si (silicon), wherein at least one of B (boron) and P (phosphorous) is present as a melting point lowering supplement to Si, and wherein B is from about 0.1 wt % to about 1.5 wt %, or wherein P is from about 0.1 wt % to about 15 wt % P. The brazing alloy may comprise contaminating elements such as at least one of C (carbon), O (oxygen), and S (sulphur). The brazing alloy may also comprise at least one micro-alloying element such as V (vanadium), Ti (titanium), W (tungsten), Nb (niobium), or Ta (tantalum). The micro-alloying element may be in an amount less than 1.5 wt % in the brazing alloy. All values are stated in weight percent, i.e. wt %. Si, B, and P lowers the liquidus temperature, that is the temperature when the brazing material is completely melted.

DETAILED DESCRIPTION

Figure 1:
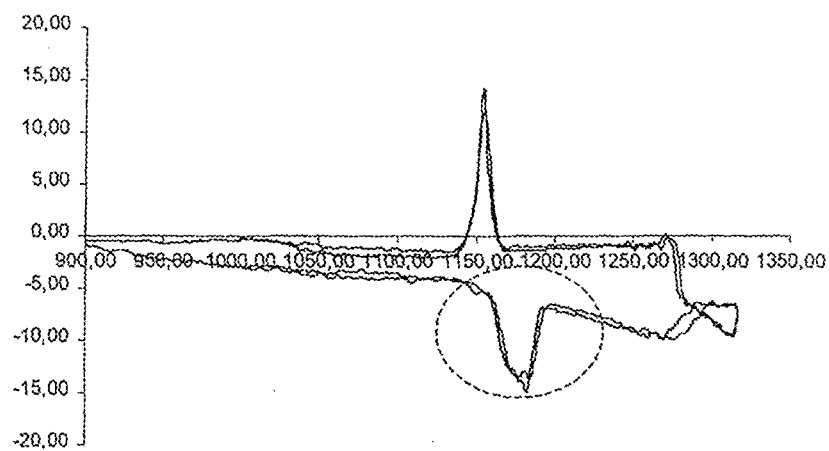
FIG. 1 shows the DTA curve for melt no. 2.

The present invention offers possibility to join objects by means of brazing by using a brazing material with mainly the same composition as the base material used for producing the product, at which the brazing material contains additive elements which lower its liquidus temperature. Consequently, the present invention offers a possibility to produce an apparatus as a plate heat exchanger, which is compatible with food application requirements by using a brazing material according to the invention. The brazing material or brazing alloy according to the invention is iron-based which means that the main element in the alloy is iron (Fe). The brazing material comprises a brazing alloy. Suitably the brazing material comprises a binder apart from the brazing alloy when the brazing alloy is in form of a powder, but the brazing alloy powder do not need to be together with a binder, i.e. in some applications the powder itself could be applied on surfaces to be brazed. The brazing material could be in form of a paste. In other applications could the brazing alloy be a foil.

The invention is mainly characterized in that the brazing material comprises a brazing alloy. The brazing alloy may comprise at least 50 wt % Fe according to one alternative according to another alternative may the alloy be balanced with Fe. The alloy may also comprise, 0-30 wt % Cr, preferably 9-30 wt % Cr, maximum 5 wt % Mn, 0-25 wt % Ni, maximum 9 wt % Mo, 0-1 wt % N and 6-20 wt % Si, all stated as weight percent, where addition of Si lowers the liquidus temperature, that is the temperature at which the brazing material is completely melted.

Apart from Si, the brazing material also may comprise B or P, which acts as a melting point decreasing element supplementing Si. The addition of B also increases the wettability of the brazing material, which makes the brazing material to flow when the brazing material is melted. The boron content in the brazing material may be below about 1.5 wt %. Since boron increases the wettability of the brazing alloy then boron need to be present in an amount of from about 0.1 wt % B to about 1.5 wt % when B is in combination with Si in the brazing alloy. B may supplement Si as liquidus temperature lowering element and B increases the wettability of the brazing alloy. In another embodiment may the iron based brazing material comprise B within a range from about 0.2 wt % to about 1.5 wt %. Instead of adding B to the brazing material it is possible to add P as a melting point decreasing element within the scope of the invention. The amount of P is in such a case maximum 15 wt %. If P replaces B as supplement to Si as liquidus temperature lowering element then P may suitably be within a range from about 0.1 wt % to about 15 wt %. According to another embodiment may P be within a range from about 0.5 wt % to about 15 wt %.

According to one embodiment may the brazing material comprise from about 8 wt % to about 20 wt % Si. According to another embodiment may the iron-based brazing material comprise from about 7 to about 16 wt % Si. The active, dissolved amount of Si could suitably be within the said range in order to obtain the desired lowering of the melting point. The analyzed amount of Si might however be considerably higher, since Si may occur in the state of silicon carbides or silicon borides, silicon could be bonded to oxygen or be chemically bonded in some other way. According to yet another embodiment may Si be within the range from about 8 to about 12 wt %.

The iron based brazing material may contain one or more micro alloying elements such as V, Ti, W, Al, Nb, Ta and others. The content of micro-alloying elements in the brazing material may be within the range of from about 0 wt % to about 1.5 wt %. The contents of micro-alloying elements may be within the range of from about 0 wt % to about 1.5 wt % for each micro-alloying element present in the brazing material. Variations in composition may also be a consequence of small inevitable amounts of contaminating elements as C, O and S.

The brazing material according to one embodiment comprises an iron-based brazing alloy which alloy comprises from about 9 wt % to about 30 wt % Cr, from about 5 wt % to about 25 wt % Ni, from about 0 wt % to about 9 wt % Mo, from about 0 wt % to about 5 wt % Mn, from about 0 wt % to about 1 wt % N, from about 8 wt % to about 20 wt % Si, from about 0.1 wt % to about 1.5 wt % B. The brazing alloy may comprises contaminating elements as at least one of C, O, and S. Optionally the brazing alloy may also comprise at least one micro-alloying element as V, Ti, W, Nb, or Ta, and the micro-alloying element may be less than 1.5 wt % in the brazing alloy.

According to another embodiment may the iron based brazing material comprise from about 8 to about 16 wt % Si. According to yet another embodiment may Si be from about 10 wt % to about 16 wt % Si. According to a further embodiment may be from about 8 to about 12 wt %. According to a further embodiment may be from about 10 to about 12 wt %.

The iron-based brazing alloy may comprise Mo within the range of from about 0.5 wt % to about 7 wt % Mo according to one embodiment. According to another embodiment may the brazing material comprise Mo within the range of from about 1 wt % to about 3.5 wt % Mo.

The brazing alloy may also comprise Mn within the range of from about 0.1 wt % to about 5 wt % Mn. According to another embodiment may the brazing alloy comprise Mn within the range of from about 0.1 wt % to about 3 wt % Mn.

According to yet another embodiment may the iron-based brazing alloy comprise from about 14 wt % to about 25 wt % Cr, from about 6 wt % to about 24 wt % Ni, from about 0.5 wt % to about 7 wt % Mo, from about 0 wt % to about 5 wt % Mn, from about 0 wt % to about 1 wt % N, from about 8 wt % to about 14 wt % Si, from about 0.2 wt % to about 1.5 wt % B, and inevitable amount of contaminating elements as at least one of C, O, and S. Optionally may the brazing alloy also comprise at least one micro-alloying element as V, Ti, W, Nb, or Ta, and the micro-alloying element is less than 1.5 wt % in the brazing alloy. According to another embodiment may the amount of Mn be within the range of from about 0.1 wt % to about 5 wt % Mn. In another embodiment may the amount of Si is from about 10 wt % to about 12 wt % Si. In yet another embodiment may the amount of B be from about 0.4 wt % to about 1.0 wt % B.

The iron based brazing material according to the invention may with advantage produced by gas atomization or water atomization. If the alloy contains boron it is also possible to produce the brazing material by melt spinning. Another possible method to produce the brazing material may be produce ingots which will be cursed and grounded to desired particle size.

The invention also comprises a brazed product produced by brazing together iron based objects, by which the product is characterized by the joining of the objects with a iron based brazing material which is an alloy with the composition mentioned above.

The brazed product is with advantage a plate heat exchanger intended for at least two heat exchanging media, which comprises at least one plate package manufactured by brazing together a number of thin walled heat exchanger plates of an iron-based material by means of an iron-based brazing material. The heat exchanger plates define between themselves plate inter spaces intended for the heat exchanging media. The brazing joints have a metallurgical composition close to the composition of the iron based plate material with locally higher amounts of Si in and around the brazing joints in comparison with the iron based plate material.

When the expression thin walled is used in connection with plate heat exchangers it is used for plates with a thickness below 1 mm. Such thin plates are necessary in order to obtain an efficient heat transfer.

The brazed product may with advantage be brazed with an iron based brazing material containing Si together with B or P.

For thin walled products as plate heat exchangers it is important to have the right relation between the amount of boron in the brazing material and the weight of the plates to be brazed. In such a case the percentage of boron will be maximum 1.5 wt % in order to avoid excessive formation of chromium borides as will be described below.

For brazing of iron based materials one has as traditionally used Cu- or Ni-brazing materials as mentioned earlier. Surprisingly it has now been found that one may start with a base material with the same composition as the material in the objects one desires to join together. By alloying such a material with silicon one may obtain well functioning brazing materials. By studying binary phase diagrams for pure iron and Si, B and P one may find that a Fe—Si alloy has a melting point minimum of 1212° C. at around 19 wt % Si. For a Fe—B alloy there is a melting point minimum at about 1174° C. for about 4 wt % B. In the Fe—P system there is a melting minimum at about 1048° C. at about 10 wt % P.

In most cases pure iron materials are not used but instead alloys are used, which apart from Fe also contains relatively large amounts of Cr and Ni. In many alloys there are also Mo, Mn, Cu and N.

In order to obtain a brazing joint the liquidus temperature of the brazing material ought to be below 1220° C.

Surprisingly enough it has been found that an addition of a relatively minor amount of silicon may give such a lowering of the liquidus temperature that a suitable brazing material may be obtained.

According to the present invention it is stated that the percentage of boron should be below 1.5 wt %. The reason for this is that the boron is contrast to the silicon diffuses very rapidly into and in the iron based material being brazed. This affects the performance of the brazed product. The best braze joints are obtained if the gap between the elements to be joined is as small as possible. The applied braze filler creates a distance between the elements to be joined due to the thickness of the braze filler in the gap. When brazing, the braze filler melts and will be pressed aside, allowing the gap to decrease. In many cases, when brazing objects, as for example plate heat exchangers, the perimeter of the objects will be heated more rapidly than the interior of the object. Consequently also the brazing material starts to melt at the perimeter. Boron starts to diffuse and with that the brazing material starts to solidify, due to the change in the composition, at the perimeter before the brazing material in the interior has melted. According to the proposed invention silicon is the element used for decreasing the melting point and boron only to a smaller extent as a melting point decreasing element. Since silicon diffuses slower than boron the diffusion time increases so that the braze filler in the interior parts can melt before the outer parts solidify. The function of boron is mainly to increase the wettability of the brazing material.

An additional reason for avoiding a high content of boron is when the brazing alloys containing chromium. Many stainless steel contain around 17 wt % Cr. The chromium content governs to a great extent the corrosion properties of the stainless steel. If there is chromium in the object to be brazed and boron in the brazing material there is a risk for formation of chromium borides. Each boron atom binds 3.8 chromium atoms if the formula for the boride is Cr 23B6. Also the fact that the relationship in the molecule weight between Cr and B is 52.0/10.8=4.8 shows that even small percentages, e.g. 2-3 wt % B may decrease the chromium content to such an extent that it will have severe effects on the corrosion resistance. The corrosion resistance of the steel will decrease with each boride that is formed. The chromium borides will be harder than the base material and have also a needle formed shape. Their shape may give rise to stress concentration and consequently crack formation.

The present invention is of great value for brazing different kinds of objects of steel. As an example the stainless steel, alloy 316, may be mentioned. The chemical composition of this alloy is max. 2.0 wt % Mn, 16.5-18 wt % Cr, 10.0-13.0 wt % Ni, 2.0-2.5 wt % Mo, the balance being Fe. According to the invention, a brazing material is prepared with the same composition as the alloy but with a suitable amount of Si replacing the same amount of Fe by weight, and Si is supplemented by B or P in the brazing material. After the brazing process the brazed product will have mainly the same composition in the brazed objects as in the brazing joints.

Another example of a suitable chemical composition for brazing the stainless steel alloy 316 could be the brazing alloy having from about 16 to about 18.5 wt % Cr, from about 10 to 14 wt % Ni, from about 1.8 to about 2.2 wt % Mo, from about 1 to about 2 wt % Mn, from about 10.5 to about 11.5 wt % Si, from about 0.5 to about 0.6 wt % B, and the balance being Fe. After the brazing process the brazed product will have mainly the same composition in the brazed objects as in the brazing joints.

The brazing material according to the invention is suitably made in the form of a powder. The powder may be manufactured by producing an ingot, which thereafter is crushed and milled. The brittle nature of the material is utilized by this manufacturing method. The disadvantages with ingot casting are that a certain risk for segregation may give rise to a non homogenous material with a melting interval which is difficult to define or is broad. For smaller ingots and/or a rapid cooling the risk for segregations is reduced. In ingot casting it is important to minimize the contact with air by using vacuum casting or casting with a shielding gas. As a consequence of the mechanical treatment the energy contents of the brazing material increases and with that its reactivity.

Further manufacturing methods to produce a powder with a homogenous composition consist of water atomization or gas atomizing. The properties of the powder vary with the manufacturing method. The crushed and milled particles are angular and pointed, the water atomized particles are nodular and the gas atomized particles are almost spherical. This difference in particle shape gives the brazing material somewhat varying properties when used for brazing. By choosing different atomizing methods and crushing/milling extent combined with screening the distribution of the particles size may be controlled. In water atomizing the oxygen content generally will be higher since water atomizing takes place at a higher oxygen potential than gas atomizing. A higher oxygen content may gives rise to formation of Si-oxides in the material which may have a negative influence on the mechanical properties of the brazing joint. The effective Si-percentage in the brazing material will consequently be lower, which means that the melting interval will be displaced.

The brazing material according to the invention may be applied on the places where one desires a brazing joint by means of different methods. A powder of the brazing material manufactured by any of the described methods may be suspended in some binder in order to be applied in some suitable manner.

EXAMPLE 1

In example 1 different alloy compositions were tested and the brazing materials were produced by melting in a small vacuum furnace. The ingots were thereafter allowed to solidify in the moulds. In Table 1 there are shown different examples of compositions of brazing materials.

TABLE 1

Analysis of some experiment melts

| Alloy | Fe | % Si | % Mn | % P | % B | % Cr | % Mo | % Ni |
|---|---|---|---|---|---|---|---|---|
| 1 | Bal | 6 | 1 | 0 | 0 | 17 | 2.5 | 12 |
| 2 | Bal | 8 | 1 | 0 | 0 | 17 | 2.5 | 12 |
| 3 | Bal | 10 | 1 | 0 | 0 | 17 | 2.5 | 12 |
| 4 | Bal | 12 | 1 | 0 | 0 | 17 | 2.5 | 12 |
| 5 | Bal | 15 | 1 | 0 | 0 | 17 | 2.5 | 12 |
| 6 | Bal | 6 | 1 | 0 | 1.5 | 17 | 2.5 | 12 |
| 7 | Bal | 6 | 1 | 3 | 0 | 17 | 2.5 | 12 |
| 8 | Bal | 10 | 1.5 | | | 17 | 2.5 | 20 |

The expression Bal (balance) means that the remaining material in the melt consists of Fe. The actual composition of the melts after the cast was measured and summarized in Table 2.

TABLE 2

Measured percentage in the ingot.

| Alloy | Fe | % Si | % Mn | % P | % B | % Cr | % Mo | % Ni | ppm O• |
|---|---|---|---|---|---|---|---|---|---|
| 1 | Bal | 5.86 | 1.43 | | | 17.1 | 2.45 | 11.9 | |
| 2 | Bal | 8.20 | 1.29 | | | 17.2 | 2.51 | 11.9 | |
| 3 | Bal | 10.0 | 1.25 | | | 17.1 | 2.46 | 12.0 | (56: 57) |
| 4 | Bal | 12.1 | 1.20 | | | 16.8 | 2.47 | 11.9 | (31: 31) |
| 5 | Bal | 14.7 | 1.81 | | | 16.6 | 2.54 | 11.9 | (38: 42) |
| 6 | Bal | 5.93 | 1.46 | | 1.20 | 16.7 | 2.42 | 11.9 | |
| 7 | Bal | 6.37 | 1.60 | 3.09 | | 17.2 | 2.51 | 11.6 | |
| 8 | Bal | 10.0 | 1.47 | | | 16.4 | 2.54 | 20.5 | (27: 30) |

•Two measurements

A powder was produced from the experimental melts according to Table 2, and brazing tests were carried out in a vacuum furnace. The maximum temperature in the furnace was about 1190° C. The specimens were examined visually for a determination, if the alloy had melted or not, if the alloy had reached and passed the solidus temperature or had melted completely, and thus had reached the liquidus temperature. The results are summarized in Table 3. In Table 3 solidus- and liquidus properties were visual determined after the test brazing at 1190° C. in a vacuum furnace.

TABLE 3

Visual determination of the solidus- and liquidus properties after test brazing at 1190. degree. C. in a vacuum furnace.

| Melt | >Solidus | >Liquidus |
|---|---|---|
| 1 | Yes | No |
| 2 | Yes | Close |
| 3 | Yes | Yes or close |
| 4 | Yes | Yes |
| 5 | Yes | Yes |
| 6 | Yes | No |
| 7 | Yes | No |
| 8 | Yes | Close |

As may be seen in Table 3 melts 2 to 5 and 8 indicate, that the material may be suitable for brazing material at a brazing temperature below 1200° C.

Figure 2:
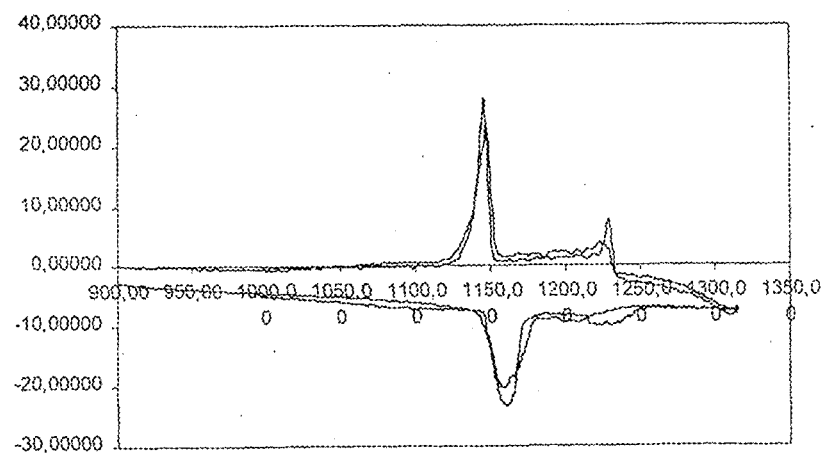
FIG. 2 shows the same curve for melt no. 3.
Figure 3:
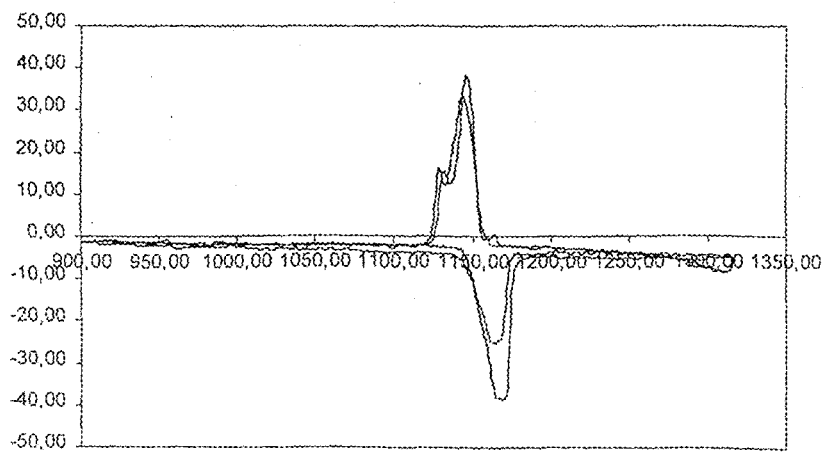
FIG. 3 for melt no. 5

FIGS. 1 to 3 show how the melts 2, 3 and 5 have been examined for measurement of the melting interval in a DTA-equipment (Differential Thermal Analysis). The measurement is performed by heating the material in two stages from room temperature to a temperature of 900° C. and thereafter to a maximal temperature of 1300° C. The material is thereafter cooled to a temperature of 900° C. The heating and the cooling are repeated twice. The peaks, which overlap each other and point downward in the diagram, show the amount of heat needed to achieve melting. The extension of the peak constitutes a measure of the melting interval of the studied alloy.

FIG. 1 shows the DTA curve for melt no. 2, FIG. 2 shows the same curve for melt no. 3 and FIG. 3 for melt no. 5. As may be seen in the figures the melting interval for an alloy with about 9% Si is 1154-1197° C. (FIG. 1), for an alloy with 10% Si 1145-1182° C. (FIG. 2) and for an alloy with 15% Si 1142-1177° C. (FIG. 3).

The accuracy of the melting interval, or deviations from the value that has been measured does not only depend on differences in the mean composition. Apart from the microstructure of the material, the content of contaminants is also important. Usually contaminating elements are C, O, S and N. At higher O-percentage Si is chemically bonded during the production process, which means that the effective, dissolved percentage of Si is reduced. This means that the liquidus temperature and the solidus temperature increase.

The percentage of carbon influences the melting temperature in such a way that a higher C-content usually yields a lower melting interval (lower solidus- and liquidus temperatures), but the corrosion properties for example are influenced in a negative way when brazing an iron based material as for example alloy 316. Variations of the solidus- and liquidus temperatures with ±10° C. are not unusual.

The accuracy of the value is also depending on which measuring instrument and on which method that is used for the analysis. An uncertainty with ±20° C. for the liquidus- and solidus temperatures is normal for alloys where an analysis with the DTA-method is common.

Further alloy compositions were tested, samples 9 to 14, and the brazing materials were produced by melting in a small vacuum furnace. Alloys 9 to 12 were brazed at a temperature of 1190° C. and alloys 13 to 14 were brazed at 1215° C. The ingots were thereafter allowed to solidify in the moulds. The results are summarized in Table 4.

TABLE 4

| Alloy | % Fe | % Si | % Mn | % P | % B | % N | % Cr | % Mo | % Ni | >Solidus | >Liquidus |
|---|---|---|---|---|---|---|---|---|---|---|---|
| 9 | bal | 12.2 | 1.5 | | | | 18 | 0.3 | 8 | Yes | Yes |
| 10 | bal | 18.1 | 1.2 | | | | 0 | 0 | 0 | Yes | Yes |
| 11 | bal | 8 | 1.5 | | 0.5 | | 17 | 2.2 | 11 | Yes | Yes |
| 12 | bal | 5 | 1.5 | 5 | | | 17 | 2.2 | 11 | Yes | Yes |
| 13 | bal | 7.8 | 0.45 | | | 0.2 | 20 | 6.1 | 18 | Yes | Yes |
| 14 | bal | 13 | 0.7 | | | | 13 | 0 | 0 | Yes | Yes |

EXAMPLE 2

To investigate the effect of boron content in iron-based braze filler on brazed joints etc different amounts of B supplementing Si in the iron-based braze fillers were tested. The amount of elements was app. 17.5 wt % Cr, app. 1.4 wt % Mn, app. 13.6 wt % Ni, app. 1.9 wt % Mo, app. 10.0 wt % Si and the boron content varied from 0 wt % to 3.7 wt % all balanced with Fe.

The tests which were used for evaluating the effect of boron content in the braze fillers on brazed product were wetting tests and corrosion tests. In both test proceedings circular test pieces were used and the preparations of the test pieces followed the proceedings of the Wetting Test Procedure described below.

Wetting Test Procedure

The circular test pieces were made of Stainless Steel, type 316, the test pieces were 0.8 mm thick and had a diameter of 85 mm. The test pieces were cleaned with detergent and rinsed with de-ionised water and acetone, 2.0 g of brazing filler was applied in the centre of each circular test piece. All the circular test pieces were then brazed with the same type of brazing cycle. The circular test pieces were brazed at a temperature of about 1200° C. for 1 hour.

Wetting and Flow Ability Test with the Circular Test Pieces.

Figure 4:
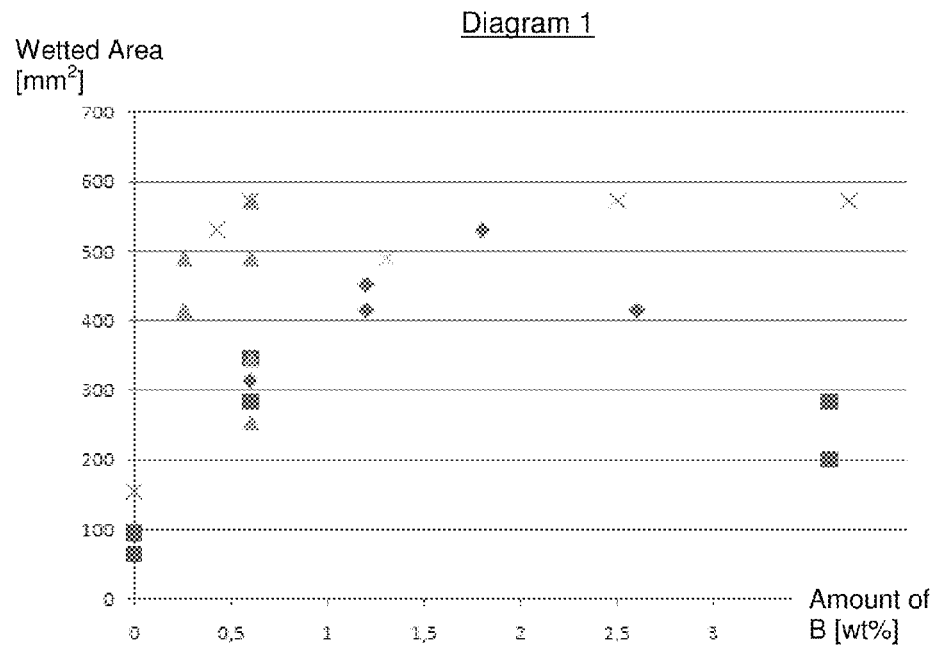
FIG. 4 shows Diagram 1 with the wetting and flow ability tests.

The wetting and flow ability test were carried out by measuring the brazed area after each brazing cycle. The results from the wetting and flow ability tests were summarized in Table 5 where the wetted area of the braze filler is measured in mm². The results are also presented in Diagram 1, see FIG. 4.

TABLE 5

Wetting tests

| B [wt %] | Wetted Area Braze Cycle 1 [mm$^2$] | Wetted Area Braze Cycle 2 [mm$^2$] | Wetted Area Braze Cycle 3 [mm$^2$] | Wetted Area Braze Cycle 4 [mm$^2$] |
|---|---|---|---|---|
| 0 | | 64* | | |
| 0 | | 95* | | |
| 0 | | | | 154* |
| 0.26 | | | 415 | |
| 0.26 | | | 491 | |
| 0.43 | | | | |
| 0.43 | | | 531 | |
| 0.6 | | 346 | | |
| 0.6 | | | 254 | |
| 0.6 | 346 | | | |
| 0.6 | | 283 | | |
| 0.6 | 314 | | | |
| 0.6 | | | 346 | |
| 0.6 | | | 491 | |
| 0.6 | | | 572 | |
| 0.6 | | | | 572 |
| 1.2 | 415 | | | |
| 1.2 | 452 | | | |
| 1.3 | | | 491 | |
| 1.8 | 531 | | | |
| 2.5 | | | 572 | |
| 2.6 | 415 | | | |
| 3.6 | | 283 | | |
| 3.6 | | 201 | | |
| 3.7 | | | 572 | |

*For all test samples with 0 wt % B, wetting angles larger than 90° were found. The rest of the test samples did not show any wetting angles larger than 90°. The wetting angles were evaluated by ocular inspection in a light optical microscope (LOM).

The wetting tests clearly show that if no boron is added to the brazing fillers, then the wetting angle is larger than 90° which were found for all tested samples with 0 wt % B. A wetting angle larger than 90° means that there is no wetting. The wetting test also shows that the wetted areas of the samples with no added boron are smaller than the wetted areas of those samples having added boron and that by adding small amounts of B the wetting area increases rapidly.

Corrosion Tests

Figure 5:
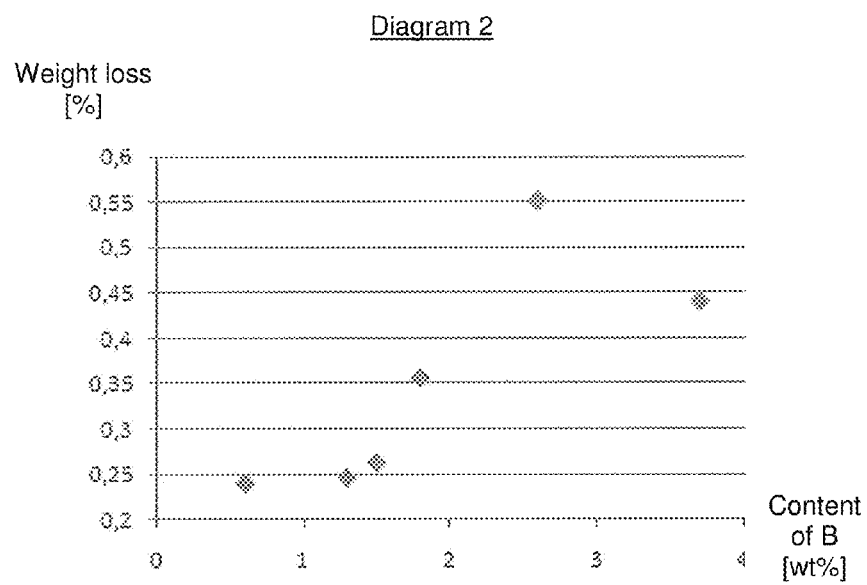
FIG. 5 shows Diagram 2 with the corrosion tests.

Corrosion tests were carried out using the same type of the circular test pieces which was used in the wetting tests. 2.0 g of brazing filler was applied in the centre of each circular test piece. The circular test pieces were brazed at a temperature of about 1200° C. for 1 hour. The corrosion rates were determined by weight loss measurements. The pieces were sectioned before the corrosion testing to adapt the width of the test pieces to the test rig, and the test pieces were corrosion tested in 16 vol-% Sulphuric acid (ISO 3651-2 Method A). The results are presented in Table 6 and in Diagram 2, see FIG. 5.

TABLE 6

Corrosion tests

| Braze Filler B [wt %] | Start weight [gram] | Stop weight [gram] | Area [cm$^2$] | Time [days] | Difference in weight [grams] | Weight loss [%] |
|---|---|---|---|---|---|---|
| 0.60 | 10.672 | 10.646 | 31 | 1 | 0.026 | 0.239 |
| 1.30 | 9.797 | 9.773 | 29 | 1 | 0.024 | 0.245 |
| 1.50 | 10.710 | 10.682 | 30 | 1 | 0.028 | 0.261 |
| 1.80 | 10.755 | 10.717 | 31 | 1 | 0.038 | 0.355 |
| 2.60 | 10.700 | 10.641 | 32 | 1 | 0.059 | 0.551 |
| 3.70 | 10.673 | 10.625 | 32 | 1 | 0.047 | 0.440 |

The corrosion results clearly show that for iron-based fillers having low contents of boron the weight losses are much lower than for iron-based fillers having high contents of boron. At boron contents which are higher than about 1.5 wt % the corrosion properties strongly decreases. Diagram 2 shows the weight losses in relation to content of boron in the iron-based brazing fillers.

EXAMPLE 3

Four different iron-based braze filler alloys according to the invention were produced to investigate the relationship between silicon and boron on the melting of the iron-based braze fillers. Two of the braze filler's melting point interval were tested, i.e. sample 1 and sample 2. Both fillers melted below 1200° C. The results are presented in Table 7. All of the iron-based braze fillers were braze tested in a vacuum furnace at app 1200° C. After brazing the braze results was ocular inspected, i.e. sample 3 and sample 4 but of course also the first two samples. All of the fillers (samples 1 to 4) were completely melted and were thus possible to use as braze fillers.

TABLE 7

Relationship of Si and B within the brazing alloy in connection to melting properties.

| Sample | Fe [wt %] | Cr [wt %] | Mn [wt %] | Ni [wt %] | Mo [wt %] | Si [wt %] | B [wt %] | Melting Interval or Melted below [° C.] |
|---|---|---|---|---|---|---|---|---|
| 1 | 57 | 16.8 | 1.48 | 11.8 | 2.15 | 10.27 | 0.49 | 1111-1140 |
| 2 | 55 | 17.1 | 1.57 | 11.8 | 2.17 | 11.74 | 0.49 | 1113-1149 |
| 3 | 55 | 17.1 | 1.38 | 14.58 | 1.85 | 9.5 | 0.63 | 1200 |
| 4 | 57 | 17.2 | 1.41 | 13.2 | 2.01 | 8.5 | 0.9 | 1200 |

EXAMPLE 4

Four different iron-based braze filler alloys according to the invention were produced to investigate the relationship between silicon and phosphorous on the melting of the iron-based braze fillers. All of the iron-based braze fillers were braze tested in a vacuum furnace at app 1200° C. After brazing the braze results was ocular inspected. All of the fillers (samples 5 to 8) were completely melted and were thus possible to use as braze fillers. The results are presented in Table 8.

TABLE 8

Relationship between Si and P within the brazing alloy in connection to melting properties.

| Sample | Fe [wt %] | Cr [wt %] | Mn [wt %] | Ni [wt %] | Mo [wt %] | Si [wt %] | P [wt %] | Melted below [° C.] |
|---|---|---|---|---|---|---|---|---|
| 5 | 58 | 16.20 | 1.43 | 11.60 | 2.19 | 7.66 | 3.10 | 1200 |
| 6 | 56 | 16.90 | 1.55 | 12.21 | 2.00 | 8.80 | 2.60 | 1200 |
| 7 | 53 | 17.40 | 1.60 | 11.02 | 2.21 | 6.19 | 8.10 | 1200 |
| 8 | 55 | 16.89 | 1.44 | 11.50 | 2.20 | 11.90 | 0.90 | 1200 |

What is claimed is:
1. An iron-based brazing material comprising an iron-based braze filler alloy consisting of:
   from 9 wt % to 30 wt % Cr;
   from 5 wt % to 25 wt % Ni;
   from 0.5 wt % to 9 wt % Mo;
   from 1 wt % to 5 wt % Mn;
   from 0 wt % to 1 wt % N;

from 8 wt % to 20 wt % Si;

wherein the braze alloy also consists of from 0.1 wt % to 1.5 wt % B; and contaminating elements as at least one of C, O, and S; and optionally the braze filler alloy also consists of at least one micro-alloying element as V, Ti, W, Nb, or Ta, and the micro-alloying element is less than 1.5 wt % in the braze filler alloy; and wherein the alloy is balanced with Fe;

wherein all values are stated in weight percent, and wherein the Si and B lowers the liquidus temperature, that is the temperature when the brazing material is completely melted, and B increases the wettability of the braze filler alloy.

2. The iron-based brazing material according to claim 1, wherein the amount of Mo is within the range of from 0.5 wt % to 7 wt % Mo.

3. The iron-based brazing material according to claim 1, wherein the amount of Mo is within the range of from 1 wt % to 3.5 wt % Mo.

4. The iron-based brazing material according to claim 1, wherein the amount of Mn is within the range of from 1 wt % to 3 wt % Mn.

5. The iron-based brazing material according to claim 1, wherein the amount of Si is from 10 wt % to 16 wt % Si.

6. The iron-based brazing material according to claim 1, wherein the amount of Si is from 10 wt % to 12 wt % Si.

7. The iron-based brazing material according to claim 1, wherein the braze filler alloy is produced by gas atomization, water atomizing, melt spinning, or by crushing, milling, or both of an ingot.

8. A brazed plate heat exchanger product manufactured by brazing objects with the iron-based brazing material according to claim 1.

9. The brazed plate heat exchanger product according to claim 8, wherein the product is a plate heat exchanger configured for at least two heat exchanging media, which comprises at least one plate package manufactured by brazing together a number of the heat exchanger plates with the iron-based brazing material, at which the heat exchanger plates between themselves define plate inter spaces configured for the heat exchanging media, at which the brazing joints have a metallurgical composition close to the composition of the iron based plate material with locally higher amounts of Si in and around the brazing joints in comparison with the iron based plate material.

10. The iron-based brazing material according to claim 1, wherein the braze filler alloy is configured to braze a parent base material of the heat exchanger plates comprising stainless steel, and the braze filler alloy has a substantially same composition plus melting point depressants as the parent base material to be brazed and has a lower melting point than the parent base material.

11. The brazed plate heat exchanger product according to claim 9, wherein a furnace is employed for the brazing.

* * * * *